US 9,223,486 B2

(12) United States Patent
Shin et al.

(10) Patent No.: US 9,223,486 B2
(45) Date of Patent: Dec. 29, 2015

(54) IMAGE PROCESSING METHOD FOR MOBILE TERMINAL

(75) Inventors: Seung Woo Shin, Seoul (KR); In Won Jong, Seoul (KR); Sang Ki Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 525 days.

(21) Appl. No.: 12/769,758

(22) Filed: Apr. 29, 2010

(65) Prior Publication Data

US 2010/0289825 A1 Nov. 18, 2010

(30) Foreign Application Priority Data

May 15, 2009 (KR) ........................ 10-2009-0042721

(51) Int. Cl.
*G06F 3/048* (2013.01)
*G09G 5/00* (2006.01)
*G06F 3/0484* (2013.01)
*G06F 3/0488* (2013.01)

(52) U.S. Cl.
CPC ........ *G06F 3/04845* (2013.01); *G06F 3/04883* (2013.01); *G06F 2203/04806* (2013.01)

(58) Field of Classification Search
USPC .................................. 715/800; 345/660, 661
See application file for complete search history.

(56) References Cited

U.S. PATENT DOCUMENTS

| | | | | |
|---|---|---|---|---|
| 2002/0149605 A1* | 10/2002 | Grossman | ..................... | 345/660 |
| 2003/0043174 A1* | 3/2003 | Hinckley et al. | .............. | 345/684 |
| 2004/0046886 A1 | 3/2004 | Ambiru et al. | | |
| 2007/0152984 A1 | 7/2007 | Ording et al. | | |
| 2008/0034316 A1 | 2/2008 | Thoresson | | |
| 2008/0129759 A1 | 6/2008 | Jeon et al. | | |
| 2009/0027421 A1* | 1/2009 | Servan-Schreiber et al. | . . | 345/661 |
| 2009/0046110 A1* | 2/2009 | Sadler et al. | ................... | 345/660 |
| 2009/0066664 A1 | 3/2009 | Wong et al. | | |
| 2009/0273571 A1* | 11/2009 | Bowens | ........................ | 345/173 |
| 2010/0073303 A1* | 3/2010 | Wu et al. | ........................ | 345/173 |
| 2010/0083108 A1* | 4/2010 | Rider et al. | ..................... | 715/702 |
| 2013/0300702 A1 | 11/2013 | Kang et al. | | |

FOREIGN PATENT DOCUMENTS

| | | | | |
|---|---|---|---|---|
| CN | 101246413 A | 8/2008 | | |
| CN | 101382853 A | 3/2009 | | |
| EP | 1956474 A2 | 8/2008 | | |
| JP | 11-065769 A | 3/1999 | | |
| JP | 11-212726 A | 8/1999 | | |
| JP | 11-327433 A | 11/1999 | | |
| JP | 2003-338975 A | 11/2003 | | |
| KR | 2007-040107 | 4/2007 | .............. | H04B 1/40 |
| KR | 10-0785071 | 12/2007 | .............. | H04B 1/40 |
| KR | 10-0835956 B1 | 6/2008 | | |

(Continued)

*Primary Examiner* — Matthew Ell

(74) *Attorney, Agent, or Firm* — Cha & Reiter, LLC

(57) ABSTRACT

An image processing method based on zooming for a mobile terminal permits touch zooming on touch screens of a plurality of devices. The image processing method preferably includes: displaying, in response to entering a touch on a touch screen displaying an image, a zooming GUI indicator for image zooming operation; performing image zooming on the touch screen in response to entering a touch point move while retaining the touch; and hiding the zooming GUI indicator from the touch screen in response to entering a touch release.

20 Claims, 8 Drawing Sheets

(56) References Cited

FOREIGN PATENT DOCUMENTS

| KR | 2008-077830 | 8/2008 | ............ G06F 3/041 |
| KR | 2008-086054 | 9/2008 | ............ G01C 21/36 |
| KR | 10-2009-0016209 A | 2/2009 | |
| KR | 2009-020157 | 2/2009 | ............ H04B 1/40 |
| TW | I296388 | 5/2008 | |
| WO | 2008-015504 A2 | 2/2008 | |

* cited by examiner

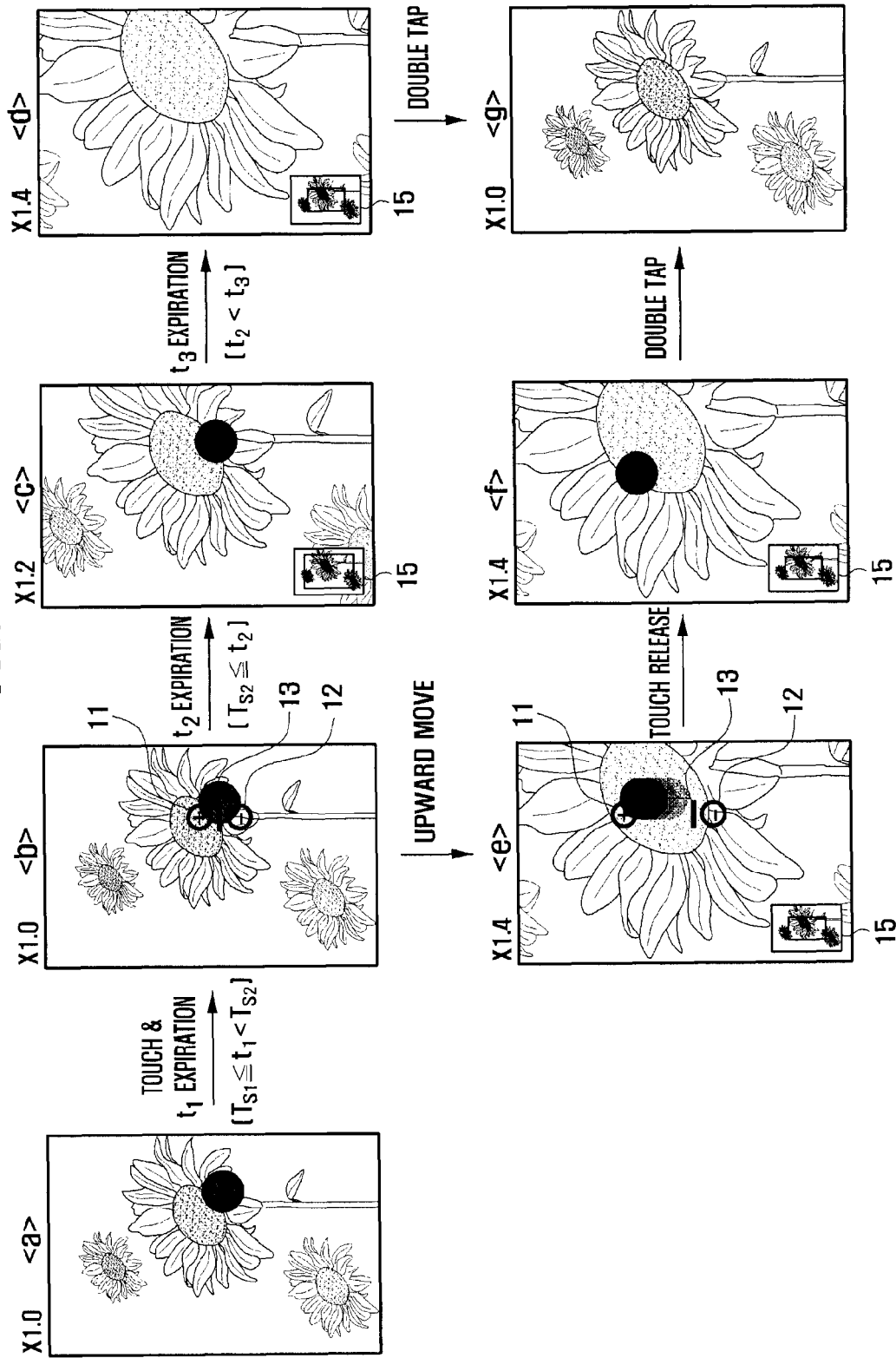

IMAGE PROCESSING METHOD FOR MOBILE TERMINAL

CLAIM OF PRIORITY

This application claims the benefit of priority from Korean Patent Application No. 10-2009-0042721 filed on May 15, 2009 in the Korean Intellectual Property Office, the entire contents of which are hereby incorporated by reference in its entirety.

BACKGROUND OF THE INVENTION

1. Field of the Invention

The present invention relates generally to image processing in a mobile terminal. More particularly, the present invention relates to an image processing methods for image zooming and display on a mobile terminal.

2. Description of the Related Art

With a rapid rise in popularity, mobile terminals have become a necessity of modern life. In terms of functionality, mobile terminals have evolved into multimedia communication devices that can provide many functions in addition to basic voice call services, such as data transmission services, and supplementary services.

Recently, image zooming functions have been introduced to mobile terminals having an image display capability. The user of such a mobile terminal may invoke the image zooming function to enlarge or reduce an image captured by the camera module or stored in advance for better viewing. Some conventional mobile terminals have been equipped with a function key for enlarging and reducing an image, and another function key for moving an enlarged image upwards, downwards, leftwards and rightwards. The user may view a desired portion of an enlarged image after typically manipulating a plurality of these function keys.

However, the user may have to repeatedly enter function keys and waste a long time for image zooming with an existing scheme. Since the typical display screen of a mobile terminal is rather small compared to other types of displays, consumers would be likely to utilize the zoom function more than they do now if it were easier to use. Hence, it is necessary to develop an easy and fast image zooming method based on a touch based user interface particularly in consideration of popular mobile terminals having a touch screen.

SUMMARY OF THE INVENTION

The present invention has been made to provide an easy and fast image zooming method for a mobile terminal having a touch screen.

In accordance with an exemplary embodiment of the present invention, there is provided an image processing method, including: displaying, in response to entering a touch on a touch screen displaying an image, a zooming GUI indicator for image zooming operation; performing image zooming on the touch screen in response to entering a touch point movement while retaining the touch; and hiding the zooming GUI indicator from the touch screen in response to entering a touch release.

In accordance with another exemplary embodiment of the present invention, there is provided an image processing method that preferably includes: measuring a touch hold time of the touch, in response to entering a touch on a touch screen displaying an image; performing image zooming on the touch screen when the measured touch hold time is longer than or equal to a threshold time; and pausing image zooming in response to entering a touch release.

In accordance with yet another exemplary embodiment of the present invention, there is provided an image processing method that preferably includes: checking, when a touch is entered on a touch screen displaying an image, whether a touch hold time of the touch is longer than or equal to a first threshold time; displaying, when the touch hold time is longer than or equal to the first threshold time, a zooming GUI indicator for image zooming operation; checking whether the touch hold time of the touch is longer than or equal to a second threshold time; performing, when the touch hold time is longer than or equal to the second threshold time, image zooming on the touch screen; and pausing image zooming when a touch release is entered.

In an exemplary feature of the present invention, the user may perform image zooming with simple touch actions. Due to a zooming GUI indicator displayed on the screen, the user may enter zooming commands in an accurate and convenient manner.

BRIEF DESCRIPTION OF THE DRAWINGS

The features and advantages of the present invention will become more apparent from the following detailed description in conjunction with the accompanying drawings, in which:

FIG. 8 illustrates screen representations related to execution of the second exemplary embodiment of FIG. 7.

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring appreciation of the subject matter of the present invention by a person of ordinary skill in the art.

In the description, "zooming" refers to enlarging and reducing a portion or the whole of an image displayed on the screen. Zooming may include the functions of enlarging (zooming in) and reducing (zooming out) that are referred to herein as "zoom-in" and "zoom-out". Zoom-in refers to enlarging a portion of a displayed image to a given magnification, and zoom-out refers to reducing an enlarged image to a given magnification.

A "base image" refers to an image having a magnification of 1, meaning there is no increase in size. That is, a base image is a non-zoomed image. If necessary, an option permitting zoom-in and prohibiting zoom-out may be set to a base image.

A "zooming GUI (graphical user interface) indicator" is displayed on the screen for zooming operations. The zooming GUI indicator may include a zoom-in icon, a zoom-out icon, and a reference icon. These icons may be separately formed, and the gaps between the icons may be altered in response to touch inputs. Preferably, the zoom-in icon is arranged on the screen at a position above the zoom-out icon, and the reference icon is arranged between the zoom-in icon and the zoom-out icon. The zooming GUI indicator may be displayed at a location relative to the touched location or may be displayed in a given zone regardless of the touched location.

While the following description is focused on use of a mobile terminal to explain the present invention, however a person of ordinary skill in the art should understand that the present invention may also be applied to larger display devices including a television set, desktop computer and laptop computer. That is, any type of thin film screen can be used. Moreover, the mobile terminal of the present invention is a terminal in an exemplary embodiment comprises a touch screen, and may be any information and communication appliance or multimedia appliance, such as a mobile communication terminal, portable multimedia player (PMP), personal digital assistant (PDA), smart phone or MP3 player.

Figure 1:
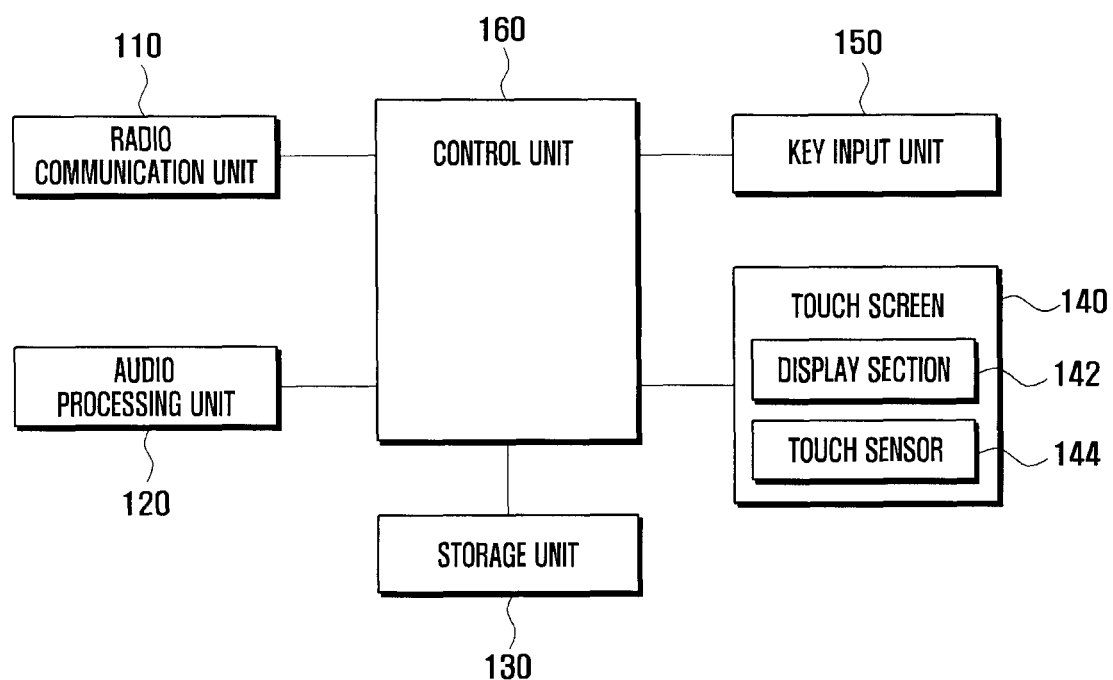
FIG. 1 is a block diagram illustrating a mobile terminal according to an exemplary embodiment of the present invention.

FIG. 1 is a block diagram illustrating a mobile terminal according to an exemplary embodiment of the present invention.

Referring now to FIG. 1, the mobile terminal may include a radio communication unit 110, audio processing unit 120, storage unit 130, touch screen 140, key input unit 150, and control unit 160.

The radio communication unit 110 may send and receive data for wireless communication of the mobile terminal. The radio communication unit 110 may include a radio frequency (RF) transmitter for upconverting the frequency of a signal to be transmitted and amplifying the signal, and an RF receiver for low-noise amplifying a received signal and downconverting the frequency of the received signal. The radio communication unit 110 may receive data through a wireless channel and forward the received data to the control unit 160, and may transmit data from the control unit 160 through the wireless channel.

The audio processing unit 120 may preferably include a coder/decoder (codec). The codec may have a data codec for processing packet data and the like, and an audio codec for processing an audio signal such as a voice signal. The audio processing unit 120 converts a digital audio signal into an analog signal through the audio codec to reproduce the analog signal through a speaker, and converts an analog audio signal from a microphone into a digital audio signal through the audio codec.

The storage unit 130 stores programs and data necessary for operating the mobile terminal, and may include a program storage area and a data storage area. The storage unit 130 may store images provided by the manufacturing process, images of target objects captured by the camera module, and images received through the radio communication unit 110 from an external server or another mobile terminal. In particular, the storage unit 130 may store image zooming programs and zoomed images.

The touch screen 140 may include, for example, a display section 142 and a touch sensor 144. The touch sensor 144 monitors whether a touch object contacts the touch screen 140. Fingers of the user and a stylus may correspond to the touch object.

The touch sensor 144 may be realized using, for example a capacitive overlay, a resistive overlay, and an infrared beam. The touch sensor 144 may also be realized using any kind of sensors capable of sensing contact or pressure, including a pressure sensor. The touch sensor 144 may be attached to the display section 142, or may be installed at or near a side of the mobile terminal. The touch sensor 144 detects a touch on the touch screen 140, generates a touch input signal, and sends the touch input signal to the control unit 160. The touch input signal may carry information on the touched location.

Still referring to FIG. 1, the display section 142 may be realized using liquid crystal display (LCD) devices or any other type of thin-film technology, and visually provides various information including menus, input data, and function setting information to the user. For example, the display section 142 may display a boot screen, idle screen, presentation screen, call handling screen, and other application related screens. The display section 142 may display an image stored in the storage unit 130 under the control of the control unit 160. In particular, the display section 142 may display the zooming GUI indicator for controlling image zooming and an associated zoomed image under the control of the control unit 160. The display section 142 may display a mini-map indicating the zooming level together with a zoomed image. The display section 142 may display information on the zooming magnification or zooming speed together with a zoomed image. The display section 142 may display the zooming GUI indicator at a location corresponding to the touched location.

The key input unit 150 generates a key signal corresponding to a key entered by the user for manipulating the mobile terminal, and sends the key signal to the control unit 160. The key input unit 150 may include a keypad composed of alphanumeric keys and directional keys, and predefined function keys that are installed at sides of the mobile terminal. When the touch sensor 144 can cover all the functions of the key input unit 150, the key input unit 150 may be excluded.

The control unit 160 preferably controls the overall operation of the mobile terminal. The control unit 160 may control the display section 142 to display one or more images stored in the storage unit 130. When the mobile terminal is equipped with a camera module, the control unit 160 may control the display section 142 to display a preview image captured by the camera module. The control unit 160 may control the touch sensor 144 to detect generation of a touch event from the user. The control unit 160 may receive a touch input signal from the touch sensor 144 and determine the touched location and touch hold time. The control unit 160 may control the display section 142 to display the zooming GUI indicator for image zooming according to a touch input signal from the touch sensor 144. The control unit 160 may control the display section 142 to display the zooming GUI indicator and at least one function invoking icon together.

The zoom is controllable by a touch and drag action. For example, when the user performs a touch action and an upward drag action, the touch sensor 144 generates a corresponding touch input signal and sends the touch input signal to the control unit 160, which then controls the display section 142 to conduct image zoom-in. When the user performs a touch action and a downward drag action, the touch sensor 144 generates a corresponding touch input signal and sends the touch input signal to the control unit 160, which then controls the display section 142 to conduct image zoom-out.

In an exemplary embodiment, the control unit 160 may control the display section 142 to conduct an image zoom-in and zoom-out relative to the touched location. Alternatively, the control unit 160 may control the display section 142 to conduct an image zoom-in and zoom-out regardless of the touched location.

In another exemplary embodiment, the control unit 160 may measure the duration for which a touch action is sustained (touch hold time), and control the display section 142 to conduct image zooming according to the measured touch hold time. The control unit 160 may control the display section 142 to display a mini-map indicating the zooming level together with a zoomed image.

Figure 2:
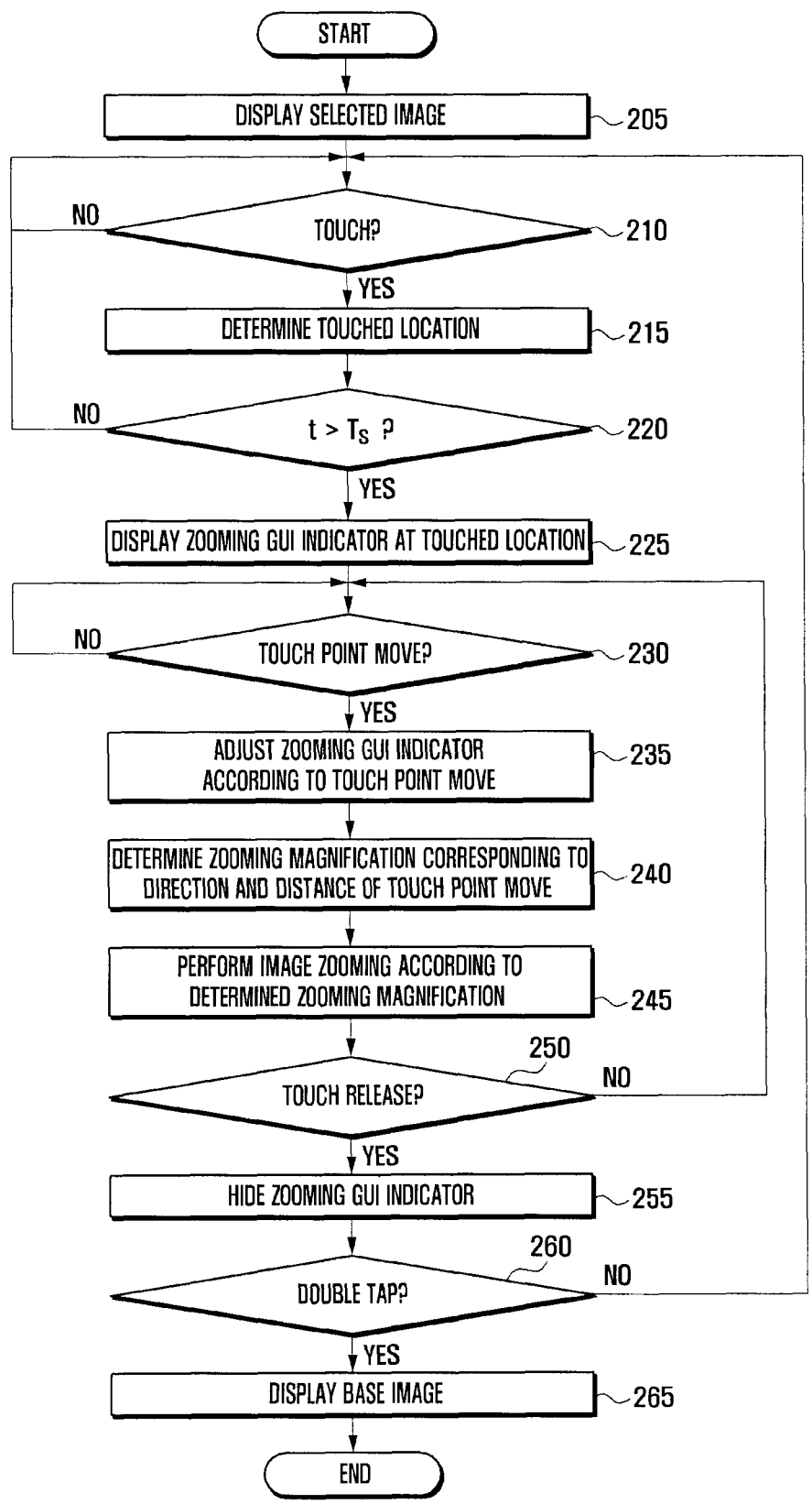
FIG. 2 is a flow chart illustrating an image processing method with zooming according to a first exemplary embodiment of the present invention.

FIG. 2 is a flow chart illustrating an image processing method with zooming according to a first exemplary embodiment of the present invention.

Referring now to FIG. 2, at step (205) the control unit 160 of the mobile terminal controls the display section 142 to display an image. The user may select at least one image stored in the storage unit 130, and the control unit 160 causes display of the selected image. When the mobile terminal has a camera module, the control unit 160 may control the camera module to capture a preview image of a target object, and control the display section 142 to display the captured preview image. The image displayed at step 205 may be a base image or a zoomed image. A base image refers to a non-zoomed image having a magnification of 1. Base images and zoomed images may be stored separately in the storage unit 130. When the control unit 160 selects a zoomed image from the storage unit 130, the image displayed at step 205 may typically be a zoomed image.

Figure 3:
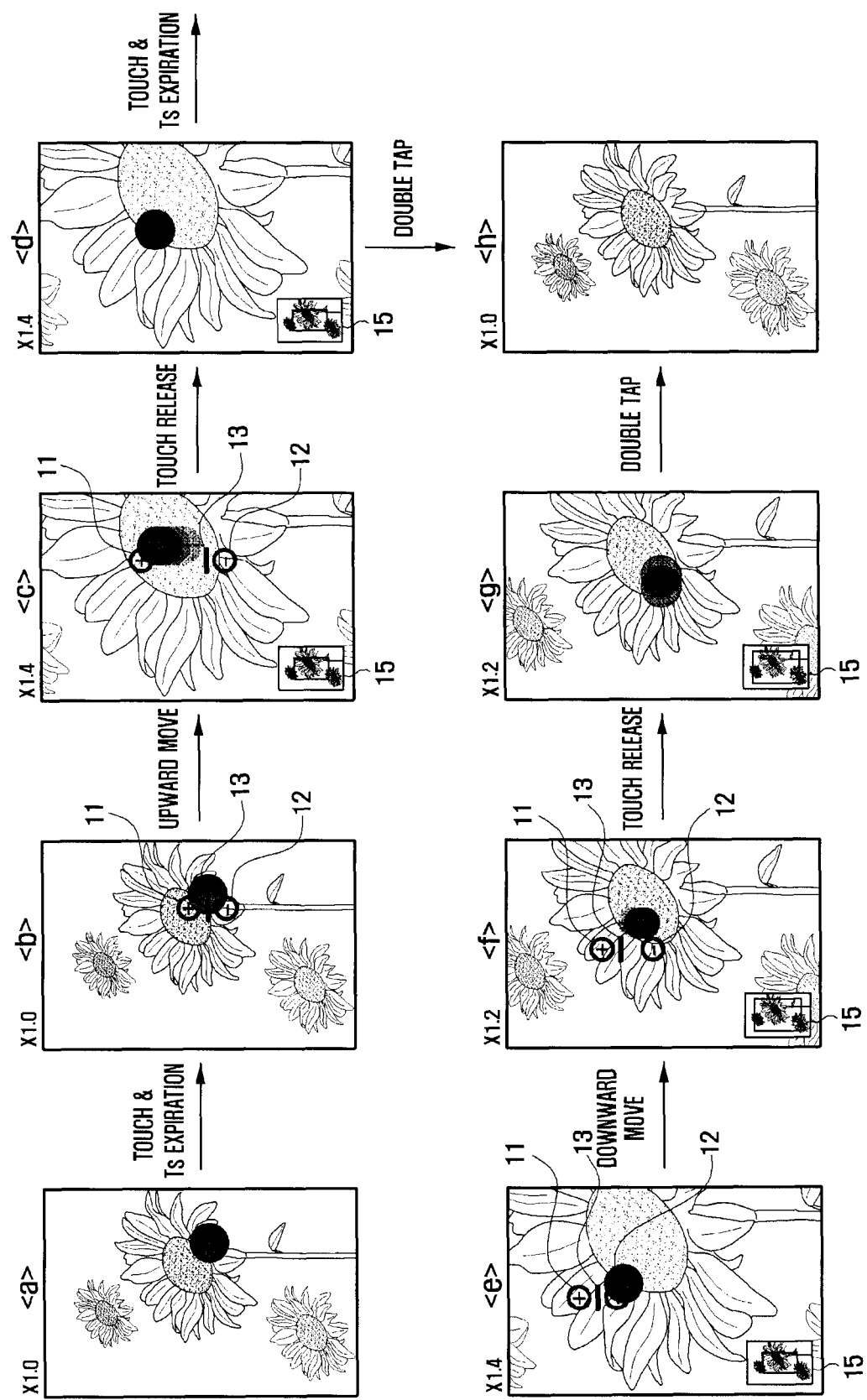
FIG. 3 illustrates screen representations related to execution of the first embodiment of FIG. 2.

At step (210), the control unit 160 determines whether the touch sensor 144 has detected a generation of touch. Here, "touch" refers to contact between the finger of the user (or other touch object such as a stylus or back of a writing instrument) and the touch screen 140. When the user touches the touch screen 140, the touch sensor 144 generates a corresponding touch input signal and sends the touch input signal to the control unit 160. The touch input signal may carry information on a generated touch and touched location. FIG. 3 illustrates screen representations related to execution of the first exemplary embodiment of FIG. 2.

In FIG. 3, the presentation of <a> depicts generation of a touch by the user during display of a base image having a magnification of 1.

Still referring to FIG. 2, at step (215) when a touch input signal is received from the touch sensor 144, the control unit 160 determines the touched location.

Then at step (220), the control unit 160 measures the touch hold time "t" and determines whether the touch hold time "t" is longer than a preset threshold time Ts. The threshold time Ts is the minimum time needed to invoke the zooming GUI indicator, and may be preset to a default value and be altered later by the user. When the user does not change the touch point for a preset time after touching, the touch sensor 144 notifies the control unit 160 of touch retention at the same location. With this notification, the control unit 160 may measure the touch hold time "t" and determine whether the touch hold time "t" is longer than the threshold time Ts.

When the touch hold time "t" is longer than the threshold time Ts, at step (225), the control unit 160 controls the display section 142 to display the zooming GUI indicator at a location corresponding to the to touched location. The zooming GUI indicator enables zooming manipulation, and may include a zoom-in icon, a zoom-out icon, and a reference icon. These icons may be separately formed, and the gaps between the icons may be altered in response to user input. Preferably, the zoom-in icon is arranged above the zoom-out icon, and the reference icon is placed between the zoom-in icon and the zoom-out icon. The control unit 160 may control the display section 142 to display the zooming GUI indicator in a given zone regardless of the touched location. Hence, the zooming GUI indicator may be displayed at a fixed location or at different locations. In FIG. 3, presentation <b> illustrates display of a zooming GUI indicator. The zooming GUI indicator in presentation <b> includes a zoom-in icon 11, a zoom-out icon 12, and a reference icon 13. The zoom-in icon 11 is placed above the zoom-out icon 12, and the reference icon 13 is placed between the zoom-in icon 11 and the zoom-out icon 12. The zoom-in icon 11, zoom-out icon 12 and reference icon 13 are displayed at a location partially overlapping the touched location. That is, the zooming GUI indicator may be displayed at a location overlapping with or near the touched location.

The control unit 160 (FIG. 1) may cause the zooming GUI indicator to be displayed together with at least one function invoking icon. A function invoking icon may take the form of a pop-up or a menu list.

Figure 4:
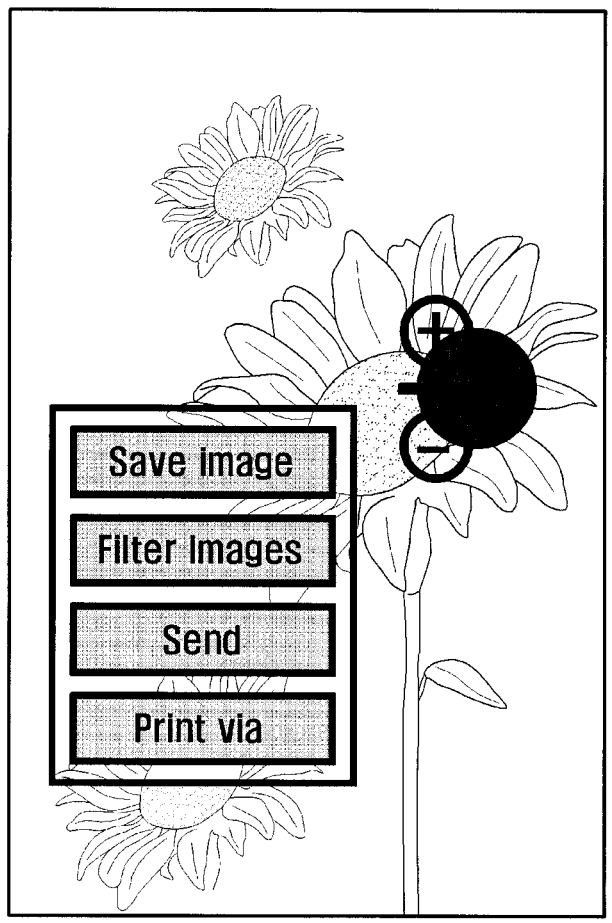
FIG. 4 is a screen representation including a zooming GUI indicator and function invoking icons.

FIG. 4 is a screen representation including both a zooming GUI indicator and function invoking icons. In FIG. 4, function invoking icons "save image", "filter image", "send" and "print via" are displayed. When the user touches a function invoking icon after touch release, the touch sensor 144 sends a corresponding touch input signal to the control unit 160 and the control unit 160 performs a function associated with the touched function invoking icon. While performing the function associated with one of the touched icons, the control unit 160 controls the display section 142 to hide the zooming GUI indicator and the function invoking icons from the screen.

In an exemplary embodiment, when a touch input signal is received at step 210 (FIG. 2) from the touch sensor 144, the control unit 160 determines the touched location and controls the display section 142 to directly display the zooming GUI indicator at the touched location without measuring and checking the touch hold time "t".

At step (230), the control unit 160 controls the touch sensor 144 to detect generation of a touch point move. Here, the touch point move refers to movement of the touch point while contact between the touch object and the touch screen 140 is retained. A drag may comprise a representative touch point move. The touch sensor 144 may generate a touch input signal carrying information on a touch point move and changed location and send the touch input signal to the control unit 160, which then can be made aware of the touch point move and changed location on the basis of the received touch input signal.

Hence, the control unit 160 may compare the touched location identified at step 210 with the changed location identified at step 230 to determine the direction and distance of a particular touch point move.

At step (235), when a touch point move is detected, the control unit 160 controls the display section 142 to adjust the location of the zooming GUI indicator according to the touch point move. The control unit 160 may control the display section 142 to adjust the location of the zooming GUI indicator having a zoom-in icon and zoom-out icon. When the user performs an upward drag action, the control unit 160 may control the display section 142 to display the zoom-in icon at a location corresponding to the end point of the drag. When the user performs a downward drag action, the control unit 160 may control the display section 142 to display the zoom-out icon at a location corresponding to the end point of the drag. A person or ordinary skill in the art understands and appreciates that the aforementioned upward and downward drags can be assigned to the opposite of the respective zoom-in or zoom-out action described herein above. Even when the zooming GUI indicator is displayed in a given zone regardless of the touched location, the location of the zoom-in icon or the zoom-out icon may be adjusted according to generation of a touch point move. In the case where the image displayed at step 205 is a base image, when the user performs a downward drag action, the control unit 160 may control the display section 142 to keep the original zooming GUI indicator without moving the zoom-out icon. In the case where an upward drag action is followed by a downward drag action without a touch release, when the end point of the drag action is placed above the reference icon, the control unit 160 may cause the zoom-in icon to be displayed at a location corresponding to the end point of the drag action; and when the end point of the drag action is placed below the reference icon, the control unit 160 may cause the zoom-out icon to be displayed at a location corresponding to the end point of the drag action.

Thereafter, referring back to FIG. 2, at step (240), the control unit 160 determines the zooming magnification corresponding to the direction and distance of the touch point move. Zooming magnifications corresponding to distances of touch point moves may be stored in the storage unit 130, and the control unit 160 may extract a zooming magnification corresponding to the distances of a touch point move from the storage unit 130. The control unit 160 may determine whether to perform a zoom-in or a zoom-out function according to the direction of a touch point move, and determine the zooming magnification according to the distance of the touch point move.

At step (245), the control unit 160 (FIG. 1) controls the display section 142 to perform image zooming according to the determined zooming magnification. The control unit 160 may control the display section 142 to display a mini-map indicating the zooming level together with a zoomed image. The mini-map shows a miniature of a zoomed portion of the whole image. In the case where an upward drag action is followed by a downward drag action without touch release, the control unit 160 may control the display section 142 to perform image zoom-out immediately after performance of the downward drag action or when the end point of the drag action is placed below the reference icon.

In FIG. 3, presentation <c> depicts a screen resulting from an upward drag action performed by the user to presentation <b>. In presentation <c>, a zoom-in icon 11 is placed at the end point of the drag action; the image is zoomed in to a magnification of 1.4; and a mini-map 15 indicating the zoom level is displayed at the lower left-hand corner.

In another exemplary embodiment, the zooming speed may be set according to the distance of a touch point move. The control unit 160 may determine whether to perform a zoom-in or a zoom-out function according to the direction of the touch point move, and determine the zooming speed according to the distance of the touch point move and perform continued image zooming according to the zooming speed.

At step (250), the control unit 160 controls the touch sensor 144 to detect generation of a touch release. When the user removes the finger or touch object from the touch screen 140, the touch sensor 144 generates a corresponding touch release signal, and sends the touch release signal to the control unit 160. The control unit 160 may be aware of touch release on the basis of the touch release signal from the touch sensor 144.

Upon detection of the touch release, at step (255) the control unit 160 controls the display section 142 to hide the zooming GUI indicator from the screen. In FIG. 3, presentation <d> depicts a screen after generation of touch release. In presentation <d>, the image is zoomed in to a magnification of 1.4 and the zooming GUI indicator is hidden. The mini-map 15 may be hidden or may remain displayed after generation of touch release.

At step (260), the control unit 160 controls the touch sensor 144 to detect generation of a double tap. A "tap" indicates a touch followed by a touch release within a preset time. In the present invention, the control unit 160 controls the display section 142 to display the zooming GUI indicator when the threshold time Ts expires after generation of a touch. Hence, a tap may correspond to generation of a touch release before expiration of the threshold time Ts after a touch. A "double tap" indicates one tap followed by another tap. The time gap between taps may be preset. The control unit 160 may recognize a double tap when a tap is followed by another tap within the time gap.

At step (265), upon detection of a double tap on the touch screen 140, the control unit 160 controls the display section 142 to display the given base image. In FIG. 3, presentation <h> depicts a screen after generation of a double tap. Presentation <h>, in which a base image having a magnification of 1 is displayed, is the same as presentation <a> (initial screen).

When a double tap is not detected, the control unit 160 returns to step 210, detects generation of a touch, and repeats the above steps. In FIG. 3, presentation <e> depicts a screen displayed when the threshold time Ts expires after a touch. In presentation <e>, the zooming GUI indicator including a zoom-in icon 11, a zoom-out icon 12 and reference icon 13 is placed at the touched location as in presentation <b>. Presentation <f> depicts a screen displayed in response to application of a downward drag to presentation <e> with touch retention. In presentation <f>, the location of the zoom-in icon 11 or the reference icon 13 is not changed, and the zoom-out icon 12 is placed near the end point of the drag action. The length of the downward drag in presentation <f> is shorter than that of the upward drag in presentation <c>. Hence, the distance between the zoom-out icon 12 and the reference icon 13 in presentation <f> is less than the distance between the zoom-in icon 11 and the reference icon 13 in presentation <c>. The image is zoomed out from a magnification of 1.4 to a magnification of 1.2. Presentation <g> depicts a screen displayed in response to the generation of a touch release. In presentation <g>, the zooming GUI indicator is hidden and the image has a magnification of 1.2. When a double tap is entered, the control unit 160 controls the display section 142 to restore the base image as illustrated by presentation <h>.

Figure 5:
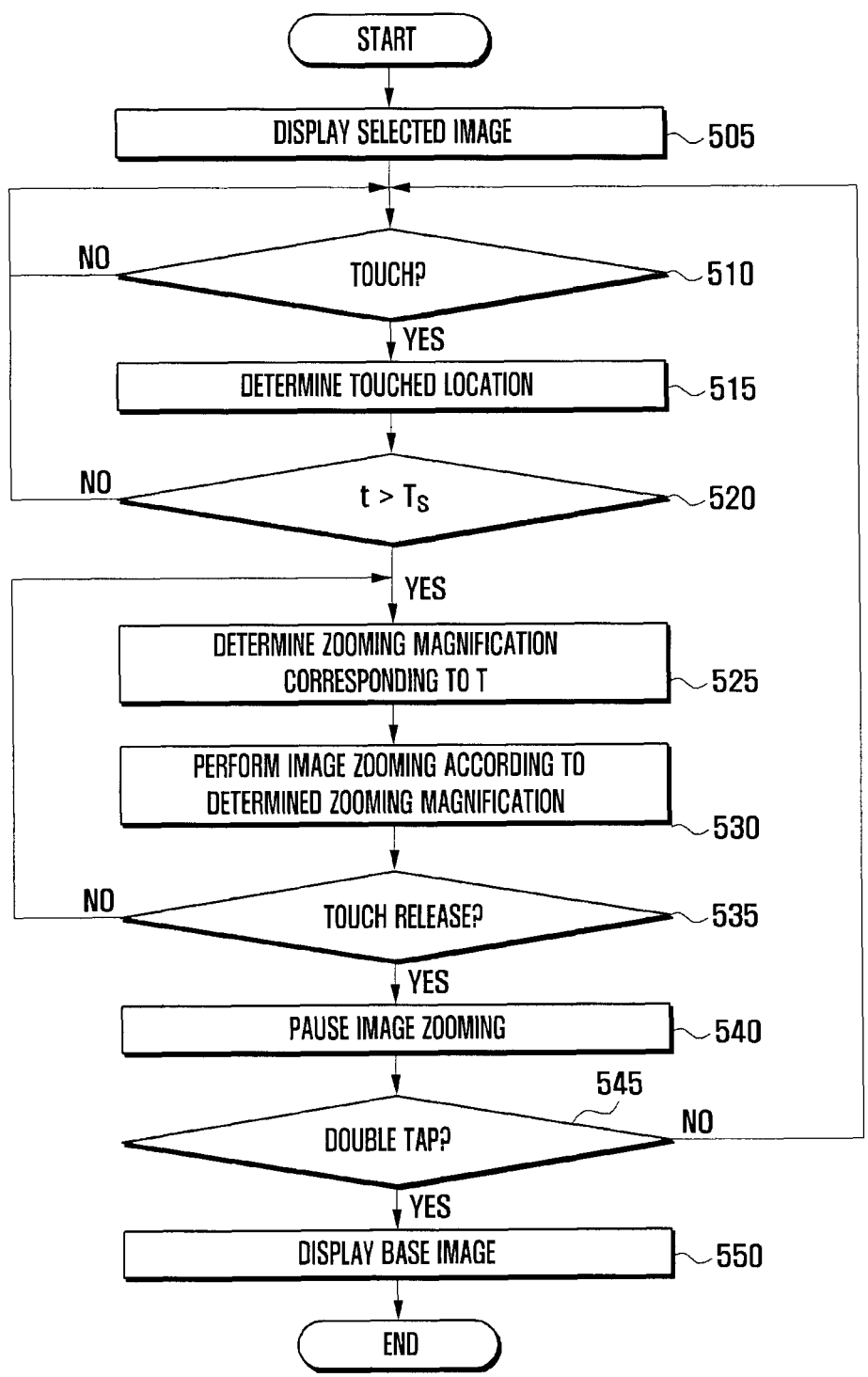
FIG. 5 is a flow chart illustrating a second exemplary embodiment of the image processing method with zooming.

FIG. 5 is a flow chart illustrating a second exemplary embodiment of the image processing method with zooming.

In FIG. 5, steps 505 to 515 are similar respectively to steps 205 to 215 in FIG. 2. That is, the control unit 160 of the mobile terminal controls the display section 142 to display a selected image, controls the touch sensor 144 to detect generation of a touch, and determines the touched location on the basis of a touch input signal from the touch sensor 144.

Figure 6:
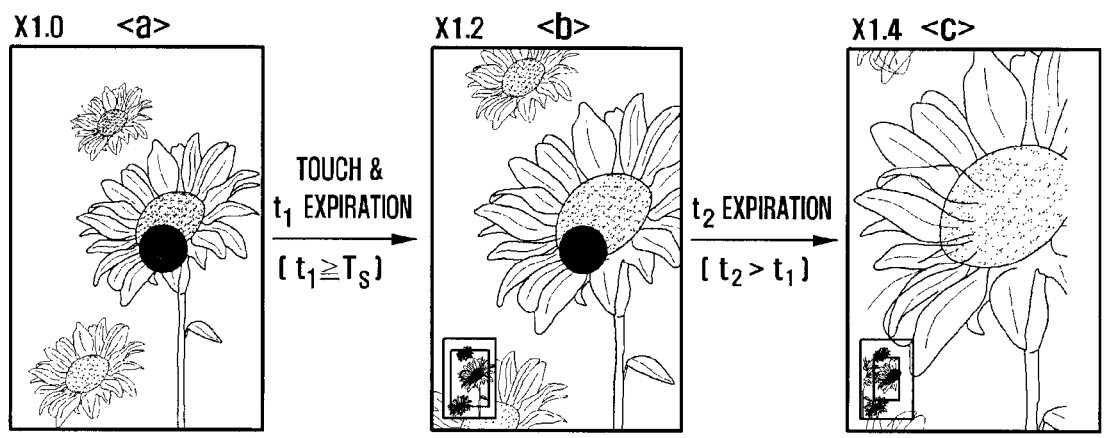
FIG. 6 illustrates screen representations related to execution of the second exemplary embodiment of FIG. 5.

FIG. 6 illustrates screen representations related to execution of the second exemplary embodiment of FIG. 5. Presentation <a> in FIG. 6 depicts a screen displaying a base image with a touch entered by the user.

At step (520), the control unit 160 measures the touch hold time "t" and determines whether the touch hold time "t" is longer than a preset threshold time Ts. The threshold time Ts is the minimum time needed to initiate image zooming.

At step (525), when the touch hold time "t" is longer than the threshold time Ts, the control unit 160 determines the zooming magnification corresponding to the touch hold time "t". Zooming magnifications corresponding to touch hold times may be stored, for example, in the storage unit 130, and the control unit 160 may extract a zooming magnification corresponding to a particular touch hold time from the storage unit 130. Zooming speed values corresponding to touch hold times may be stored in the storage unit 130, and the control unit 160 may extract a zooming speed value corresponding to a particular touch hold time from the storage unit 130. When the touch sensor 144 includes a pressure sensor, zooming speed values corresponding to touch pressure values may be stored in the storage unit 130, and the control unit 160 may extract a zooming speed value corresponding to/based on a particular touch pressure value from the storage unit 130.

At step (530), the control unit 160 controls the display section 142 to perform image zooming according to the determined zooming magnification. When zooming speed values corresponding to touch hold times are stored in the storage unit 130, the control unit 160 may control the display section 142 to perform image zooming according to the determined zooming speed. In FIG. 6, presentation <b> depicts a screen displayed when a time t1 (>=Ts) expires after a touch. It is assumed that an association between a zooming magnification of 1.2 and time t1 is stored in the storage unit 130. The control unit 160 controls the display section 142 to zoom in on the image from a magnification of 1 to a magnification of 1.2, and to display a mini-map together with the zoomed image. Presentation <c> depicts a screen displayed when a time t2 (>t1) expires after a touch. It is assumed that an association between a zooming magnification of 1.4 and time t2 is stored in the storage unit 130. The control unit 160 controls the display section 142 to zoom in on the image from a magnification of 1.2 to a magnification of 1.4.

The control unit 160 controls the display section 142 for continuous performance of image zooming at various magnifications until generation of a touch release. For example, assume that image zooming is possible from a magnification of 1.1 to a magnification of 3 in increments of 0.1, and three touch hold times ta1 to ta3 are associated with the zooming magnifications. Then, the control unit 160 may control the display section 142 to zoom in the image at a magnification of 1.1 when the time ta1 expires, to zoom in the image at a magnification of 1.2 when the time ta2 expires, and to continue image zooming until the time ta3 expires. In FIG. 6, the time t1 corresponds to a value between ta2 (magnification of 1.2) and ta3, and the time t2 corresponds to a value between ta4 (magnification of 1.4) and ta5.

At step (535), the control unit 160 controls the touch sensor 144 to detect generation of touch release. Upon generation of touch release, the touch sensor 144 sends a corresponding touch release signal to the control unit 160.

Upon reception of the touch release signal, at step (540) the control unit 160 pauses image zooming, and freezes the zoomed image in a state at the time of touch release.

At step (545), the control unit 160 controls the touch sensor 144 to detect generation of a double tap. Upon detection of a double tap on the touch screen 140, at step (550), the control unit 160 controls the display section 142 to display the base image.

Figure 7:
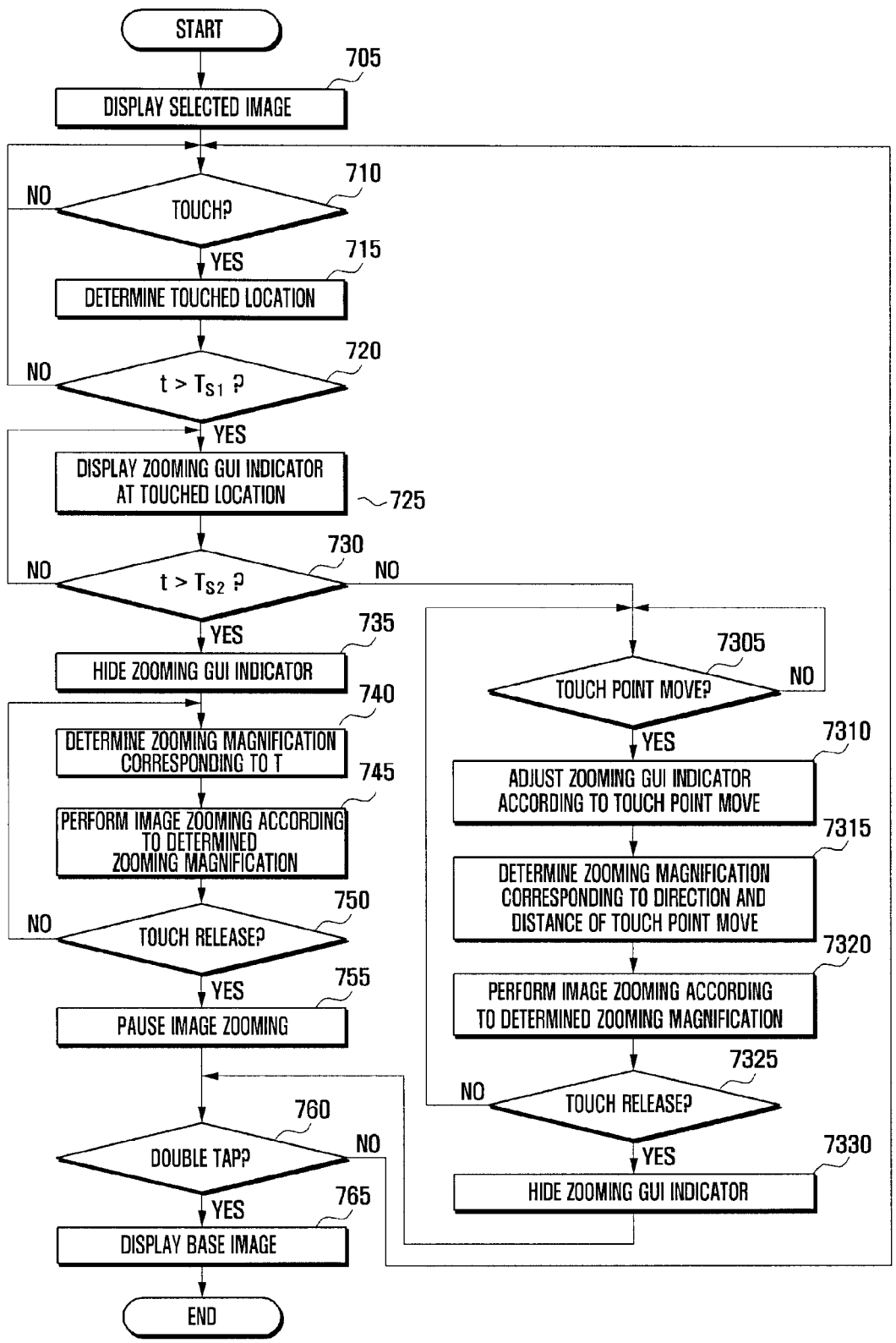
FIG. 7 is a flow chart illustrating a third exemplary embodiment of the image processing method with zooming.

FIG. 7 is a flow chart illustrating a third embodiment of the image processing method with zooming.

In FIG. 7, steps 705 to 715 are respectively similar to steps 205 to 215 in FIG. 2. That is, the control unit 160 of the mobile terminal controls the display section 142 to display a selected image, controls the touch sensor 144 to detect generation of a touch, and determines the touched location on the basis of a touch input signal from the touch sensor 144. FIG. 8 illustrates screen representations related to execution of the third exemplary embodiment shown in FIG. 7. Presentation <a> in FIG. 8 depicts a screen displaying a base image with a touch entered by the user.

At step (720), the control unit 160 measures the touch hold time "t" and determines whether the touch hold time "t" is longer than a first threshold time Ts1. The first threshold time Ts1 is the minimum time needed to invoke the zooming GUI indicator. When the touch hold time "t" is longer than the first threshold time Ts1, then at step (725), the control unit 160 controls the display section 142 to display the zooming GUI indicator at a location corresponding to the touched location. In FIG. 8, presentation <b> illustrates display of a zooming GUI indicator. The zooming GUI indicator in presentation <b> includes a zoom-in icon 11, a zoom-out icon 12, and a reference icon 13.

At step (730), the control unit 160 newly measures the touch hold time "t" and determines whether the touch hold time "t" is longer than a second threshold time Ts2. The second threshold time Ts2 is the minimum time needed to initiate image zooming according to the touch hold time.

When the touch hold time "t" is longer than the second threshold time Ts2, then at step (735) the control unit 160 controls the display section 142 to hide the zooming GUI indicator.

At step (740), the control unit 160 determines the zooming magnification corresponding to the touch hold time "t", and at step (745) controls the display section 142 to perform image zooming according to the determined zooming magnification. In FIG. 8, presentation <c> depicts a screen displayed when the time t2 (>=Ts2) Ts expires after a touch. It is assumed that an association between a zooming magnification of 1.2 and time t2 is stored in the storage unit 130. The control unit 160 controls the display section 142 to hide the zooming GUI indicator and to zoom in the image from a magnification of 1 to a magnification of 1.2. Presentation <d> depicts a screen displayed when the time t3 (>t2) expires after a touch. It is assumed that an association between a zooming magnification of 1.4 and time t3 is stored in the storage unit 130. The control unit 160 controls the display section 142 to zoom in the image from a magnification of 1.2 to a magnification of 1.4. Of course, a person of skill in the art understands and appreciates that the values of 1.2, 1.4, could be 0.8 and 0.6, for example.

At step (750), the control unit 160 controls the touch sensor 144 to detect generation of touch release. Before generation of touch release, the control unit 160 controls the display section 142 to continuously perform image zooming. When associations between zooming magnifications and touch hold times are provided and continuous image zooming at various magnifications is set, the control unit 160 controls the display section 142 to continuously perform image zooming at various magnifications according to the length of the touch hold time.

At step (755), upon reception of a touch release signal from the touch sensor 144, the control unit 160 pauses image zooming. Then at step (760) the control unit 160 controls the touch sensor 144 to detect generation of a double tap.

Upon detection of a double tap on the touch screen 140, at step (765), the control unit 160 controls the display section 142 to display the base image. In FIG. 8, presentation <g> depicts a screen displayed when a double tap is entered. Presentation <g> shows a base image having a magnification of 1, and corresponds to presentation <a> (initial screen).

When the touch hold time "t" is not longer than the second threshold time Ts2 at step 730, then at step (7305), the control unit 160 controls the touch sensor 144 to detect generation of a touch point move. Here, subsequent steps 7310 to 7330 are respectively similar to steps 235 to 255 of FIG. 2. When a touch point move is detected, at step (7310), the control unit 160 controls the display section 142 to adjust the location of the zooming GUI indicator according to the touch point move. As in the case of FIG. 2, the location of the zoom-in icon 11 or the zoom-out icon 12 may be changed.

At step (7315), the control unit 160 determines the zooming magnification corresponding to the direction and distance of the touch point move, and at step (7320) to control the display section 142 to perform image zooming according to the determined zooming magnification.

At step (7325), the control unit 160 controls the touch sensor 144 to detect generation of touch release. Upon detection of touch release, at step (7330) the control unit 160 controls the display section 142 to hide the zooming GUI indicator from the screen.

The control unit 160 (FIG. 2) controls the touch sensor 144 to detect generation of a double tap (760).

At step (765), when a double tap is entered on the touch screen 140, the control unit 160 controls the display section 142 to display the base image.

When a double tap is not entered, the method returns to step (710) for further processing.

In FIG. 8, presentation <e> depicts a screen resulting from an upward drag action performed by the user to presentation <b>. In presentation <e>, the zoom-in icon 11 is placed at the end point of the drag action; the image is zoomed in to a magnification of 1.4; and a mini-map 15 indicating the zooming level is placed at the lower left corner. Presentation <f> depicts a screen after generation of touch release. In presentation <d>, the image is zoomed in to a magnification of 1.4 and the zooming GUI indicator is hidden. When a double tap is entered on the screen of presentation <f>, the base image having a magnification of 1 is displayed as in presentation <g>.

The above-described methods according to the present invention can be realized in hardware or as software or computer code that can be stored in a recording medium such as a CD ROM, a RAM, thumbnail drive, a floppy disk, a flash storage, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. An image processing method, comprising:
    entering into a zooming mode and displaying on an image a zooming GUI indicator for an image zooming operation in response to sensing a touch of the image on a touch screen for a predetermined time at a touched location of the image being displayed;
    performing image zooming on the image displayed on the touch screen; and
    stopping a display of the zooming GUI indicator from the touch screen in response to sensing a release of touch from the touch screen,
    wherein the method further comprises:
    checking whether a touch point move is entered while retaining the touch on the touch screen when a touch hold time is not longer than or equal to the predetermined time; and
    conducting image zooming on the touch screen according to an end point of the touch point move when a touch point move is entered.

2. The image processing method of claim 1, wherein the touch screen continues to display the image after stopping a display of the zooming GUI indicator.

3. The image processing method of claim 1, wherein stopping the display of the zooming GUI indicator comprises hiding the display from user view.

4. The image processing method of claim 1, wherein the displaying a zooming GUI indicator comprises overlaying the zooming GUI indicator display with the image.

5. The image processing method of claim 1, wherein the zooming GUI indicator comprises a zoom-in icon, a zoom-out icon, and a reference icon.

6. The image processing method of claim 5, wherein performing image zooming comprises moving the zoom-in icon or zoom-out icon on the touch screen according to the touch point move.

7. The image processing method of claim 1, wherein performing image zooming comprises zooming in on the image displayed by the touch screen in response to entering an upward touch point move, and zooming out on the image displayed by the touch screen in response to entering a downward touch point move.

8. The image processing method of claim 1, wherein performing image zooming comprises zooming in and zooming out on the displayed image with respect to a touched location.

9. The image processing method of claim 1, wherein performing image zooming comprises zooming in and zooming out on the displayed image according to a zooming magnification matched with the distance of a touch point move.

10. The image processing method of claim 1, wherein displaying a zooming GUI indicator is performed when a preset time expires after sensing a touch has been entered on the touch screen.

11. An image processing method, comprising:
    entering into a zooming mode by measuring a touch hold time of a touch of an image, in response to sensing a touch of an image on a touch screen that is displaying the image;
    performing image zooming on the image displayed on the touch screen when the measured touch hold time is longer than or equal to a threshold time comprising checking whether a touch point move is entered while retaining the touch on the touch screen when the touch hold time is not longer than or equal to the threshold time;
    pausing image zooming in response to sensing a release of touch of the image from the touch screen; and
    conducting image zooming on the touch screen according to an end point of the touch point move when the touch point move is entered.

12. The image processing method of claim 11, wherein performing image zooming comprises zooming in and zooming out of the displayed image according to a zooming magnification matched with the touch hold time.

13. The image processing method of claim 11, further comprising displaying a zooming GUI indicator for image zooming operation.

14. The image processing method of claim 13, further comprising hiding the zooming GUI indicator.

15. An image processing method, comprising:
measuring a touch hold time of the touch, in response to sensing a touch on a touch screen that is displaying an image;
performing image zooming on the image displayed on the touch screen when the measured touch hold time is longer than or equal to a threshold time;
pausing image zooming in response to sensing a release of touch from the touch screen; and
displaying a zooming GUI indicator for an image zooming operation,
wherein the method further comprises:
checking whether a touch point move is entered while retaining the touch on the touch screen when the touch hold time is not longer than or equal to the threshold time; and
conducting image zooming on the touch screen according to an end point of the touch point move when a touch point move is entered.

16. The image processing method of claim 15, wherein the zooming GUI indicator comprises a zoom-in icon, a zoom-out icon, and a reference icon.

17. The image processing method of claim 16, wherein performing image zooming further comprises moving the zoom-in icon or zoom-out icon on the touch screen according to the touch point move.

18. The image processing method of claim 15, wherein performing image zooming comprises zooming in and zooming out on the image according to a zooming magnification matched with the distance of the touch point move.

19. An image processing method, comprising:
checking whether a touch hold time of a touch is longer than or equal to a first threshold time when said touch is entered on a touch screen displaying an image;
displaying a zooming GUI indicator for image zooming operation, when the touch hold time is longer than or equal to the first threshold time;
checking whether the touch hold time of said touch is longer than or equal to a second threshold time;
performing image zooming on the touch screen when the touch hold time is longer than or equal to the second threshold time;
pausing image zooming when a touch release is sensed;
checking whether a touch point move is entered while retaining the touch when the touch hold time is not longer than or equal to the second threshold time; and
performing image zooming on the touch screen when a touch point move is entered.

20. The image processing method of claim 19, further comprising hiding the zooming GUI indicator when the touch hold time is longer than or equal to the second threshold time.

* * * * *